United States Patent [19]

Nassouri

[11] Patent Number: 5,680,095
[45] Date of Patent: Oct. 21, 1997

[54] SECURITY APPARATUS

[75] Inventor: Faris Nassouri, West Bloomfield, Mich.

[73] Assignee: Gordon Hartunian, Pontiac, Mich.

[21] Appl. No.: 352,242

[22] Filed: Dec. 8, 1994

[51] Int. Cl.[6] ............................................. B60R 25/10
[52] U.S. Cl. ............................ 340/426; 340/430; 340/542;
340/546; 70/427; 70/455
[58] Field of Search ................................. 340/430, 426,
340/539, 542, 545, 546, 547, 557, 429,
686, 551, 296; 70/49, 455, 323, 324, 427,
428; 200/61.93, 61.71

[56] References Cited

U.S. PATENT DOCUMENTS

| | | | |
|---|---|---|---|
| 3,873,966 | 3/1975 | Tanner | 340/429 |
| 3,898,824 | 8/1975 | Borlinghaus | 70/455 |
| 3,986,166 | 10/1976 | Kohn | 340/428 |
| 4,000,632 | 1/1977 | Summan | 70/165 |
| 4,030,628 | 6/1977 | Hippert, Jr. | 220/728 |
| 4,034,337 | 7/1977 | Haddock | 340/430 |
| 4,062,314 | 12/1977 | Allen et al. | 116/85 |
| 4,151,508 | 4/1979 | Hensler et al. | 307/10.2 |
| 4,339,747 | 7/1982 | Maybee | 340/546 |
| 4,546,266 | 10/1985 | Zenick et al. | 307/10.2 |
| 4,575,706 | 3/1986 | Heidman, Jr. | 340/426 |
| 4,737,762 | 4/1988 | Ohnishi | 340/426 |
| 4,803,467 | 2/1989 | Peters | 340/542 |
| 4,983,947 | 1/1991 | Mullen et al. | 340/426 |
| 4,983,948 | 1/1991 | Sunami | 340/426 |
| 4,985,693 | 1/1991 | Sunami | 340/426 |
| 4,985,694 | 1/1991 | Sunami | 340/426 |
| 4,996,514 | 2/1991 | Sunami | 340/426 |
| 5,121,098 | 6/1992 | Chen | 340/457 |

Primary Examiner—Jeffery Hofsass
Assistant Examiner—Davetta Woods
Attorney, Agent, or Firm—Young & Basile, PC

[57] ABSTRACT

A security apparatus for buildings, vehicles and the like includes a switch mounted adjacent to a closure access member. A housing mounted adjacent to the closure access member receives a member movable between first and second positions. When the movable member is in the first position, a magnet mounted in the member is disposed in close proximity to the switch to magnetically move the switch contact to an open position. When the movable member is moved to a second position, the magnet is magnetically decoupled from the switch enabling the switch contact to close to ground completing a circuit to activating the alarm. In another embodiment, the magnet is mounted in a body. A rod extends from the body and carries a holder and a lock cylinder engagement member at another end. The lock cylinder engagement member is releasibly insertible into a lock cylinder to position the magnet adjacent to a switch mounted on the closure member. Any removal of the key lock cylinder engagement member separates the magnet from the switch causing the switch contact to close to ground activating the alarm. In another embodiment, a grounded key inserted into a lock cylinder completes a circuit through a relay coil activating the relay coil and causing a relay switch contact to open disabling the alarm. Removal of the key de-energizes the relay causing the switch contact to move to a normally closed position activating the alarm.

14 Claims, 3 Drawing Sheets

SECURITY APPARATUS

BACKGROUND OF THE INVENTION

1. Field of the Invention

The present invention relates, in general, to security apparatus and, more specifically, to security apparatus for vehicle, buildings and the like.

2. Description of the Art

Security systems for buildings, homes or vehicles typically include detection switches mounted at various access points, such as doors, windows, etc., which are wired to an audible alarm to detect the opening of the doors or windows during an attempt to gain unauthorized access to the building, home or vehicle. Such detection switches typically include a movable plunger which contacts and moves when the door or window is closed to switch a contact to an open position the switch contact is wired in a circuit typically between ground and an audible alarm so as to open the circuit de-energize the audible alarm when the door or window is closed. When the door or window is moved toward an open position, the plunger moves closing the switch contact and completing a path to ground between the alarm, power supply and ground to activate the audible alarm.

In vehicle security systems, such closure detection switches are mounted on the doors, trunk or hood to detect entry to the vehicle or opening of the trunk or hood. The opening of the door, trunk or hood causes the plunger of a switch to move or extend thereby closing the switch contact and completing a circuit path between the power supply, the audible alarm and ground to activate the alarm.

However, despite the usefulness of such vehicle and building or home security systems, a thief, in an attempt to gain access to the building, home or vehicle frequently damages the door, window, trunk or hood lock.

Thus, it would be desirable to provide a security apparatus which activates an alarm before any damage occurs to a building, home or vehicle entry point or closure lock. It would also be desirable to provide a security apparatus which provides an easily visible indication of the use of the security apparatus to act as a deterrent to unauthorized entry into the protected area. It would also be desirable to provide a security apparatus which can easily be mounted over entry locks in a position which requires movement of a portion of the security apparatus to gain access to the lock.

SUMMARY OF THE INVENTION

The present invention is a security apparatus for homes, buildings, vehicles and the like which includes a detector switch mounted adjacent a closure access member, such as a key operated lock on a door, window, etc. The security apparatus includes a housing mountable over or adjacent to the closure access member, such as a key operated lock. A member is movably mounted on the housing for movement between first and second positions. The movable member carries a magnet.

The detector switch, which can be a reed switch, is mounted on the interior of the closure member and is responsive to the close proximity of the magnet, when the magnet and the movable member are in a first position, such that the magnet causes a contact of the switch to switch from a first, typically closed position to a second, open position opening a circuit between a conventional alarm and ground. When the movable member and the magnet are moved to the second position spaced from the closure access lock, the magnet is spaced from the switch to decouple the magnet from the switch. This enables the switch contact to close thereby completing a circuit to ground to activate the alarm.

In one embodiment, the movable member is pivotally mounted on the housing for movement in a plane parallel to the plane of the housing. In another embodiment, the movable member is pivotally attached to the housing for pivotal movement out of the plane of the housing.

In yet another embodiment, the magnet is mounted in a body. A rod extends from the body and carries a lock cylinder engagement member at an outer end. The lock cylinder engagement member is adapted to be urged into a key lock cylinder on the closure member to position and retain the magnet in the body closely adjacent to a switch mounted interiorly on the closure member. Any movement or removal of the lock cylinder engagement member or rod from the lock cylinder decouples the magnet from the switch causing the switch contact to close thereby activating the alarm.

In yet another embodiment, a key or lock cylinder engagement member is connected by a conductor to ground, typically by a wire attached to the key or lock cylinder engagement member at one end and to the vehicle body structure at another end. A relay is connected between the vehicle power supply, i.e., battery, and the lock cylinder such that insertion of the key or lock cylinder engagement member into the lock cylinder grounds the relay coil thereby enabling the coil to be energized and causing a relay contact to switch to an open position. The relay contact is connected between ground and the alarm so as to inhibit operation of the alarm when the contact is in the open position. However, removal of the key from the lock cylinder de-energizes the relay thereby causing the relay contact to switch to the closed position completing a circuit to ground through the alarm to activate the alarm.

In all of the various embodiments of the present invention, the security apparatus deters any attempt to gain unauthorized access to a building, home or vehicle by use of or removal of a closure lock cylinder on the building, home or vehicle since the security apparatus immediately activates the alarm when the apparatus is moved from a normal position covering the closure lock cylinder. In several of the embodiments of the present invention, the movable member covers the key lock cylinder when in a first position such that any attempt to access the key lock cylinder requires movement of the movable member which will activate the alarm prior to any use of or damage to the key lock cylinder.

The security apparatus of the present invention is easily mounted on various vehicle, building or home closure members adjacent to key lock cylinders on such closure members. In addition, the security apparatus is formed of only a few components for a low manufacturing cost. Finally, the security apparatus of the present invention may be easily incorporated into existing vehicle or building and home security systems without extensive modification to such security systems.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
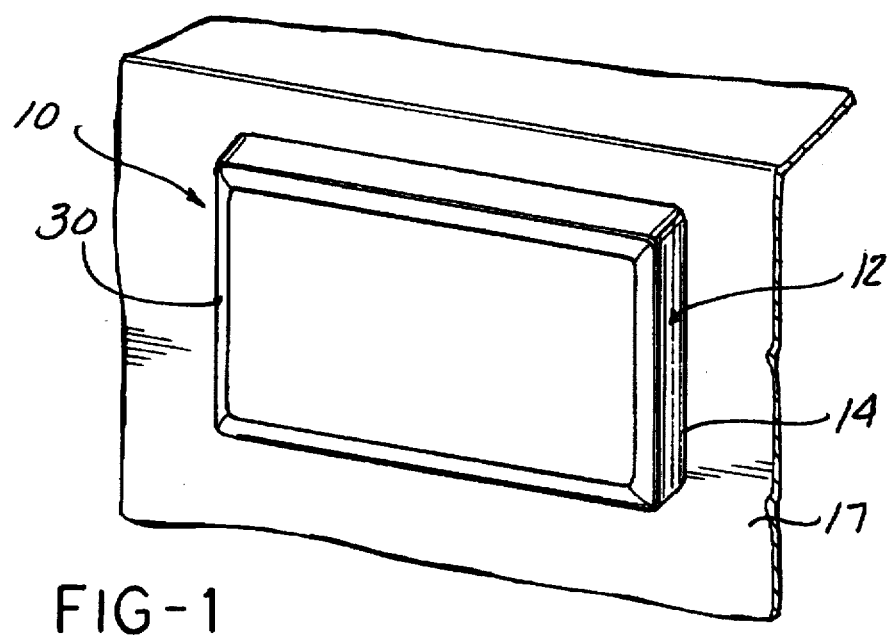
FIG. 1 is a perspective view of a first embodiment of a security apparatus according to the present invention.

By way of background, security systems have been devised for protecting buildings, homes and vehicles. Such security systems typically monitor access points, such as closure members including doors, windows, trunks, hoods, etc., of such buildings, homes or vehicles to detect any movement of such closure members after the security system has been enabled.

Switches including a movable plunger are used in such security systems, with the switches being mounted such that the plunger contacts the closure member when the closure member is closed and is moved to one position. This movement of the plunger and causes a switch contact to typically move to a normally closed position to an open position. The switch contact leads are typically connected to ground and to another switch or to the security system alarm. When the closure member is moved, the resulting movement of the plunger causes the switch contact to move to the closed portion thereby completing a circuit through the alarm to ground to activate the alarm.

A first embodiment of the present security apparatus 10 is shown in FIGS. 1–4. In this embodiment, the security apparatus 10 includes a housing 12 which is adapted to be mounted over or adjacent to a closure member access point, such as a key lock cylinder 13 shown in FIG. 2. The housing 12 has a generally planar configuration with a peripheral, generally square, rectangular or circular rim 14. An aperture 16 is formed within the rim 14, with the key lock cylinder 13 located in line with the aperture 16 when the housing 12 is mounted in a use position.

Figure 2:
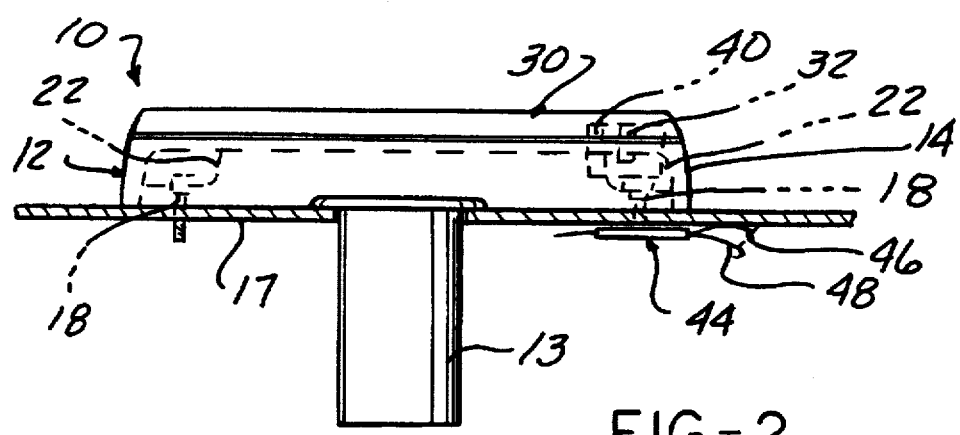
FIG. 2 is a partially cross sectioned, side elevational view of the security apparatus shown in FIG. 1.
Figure 3:
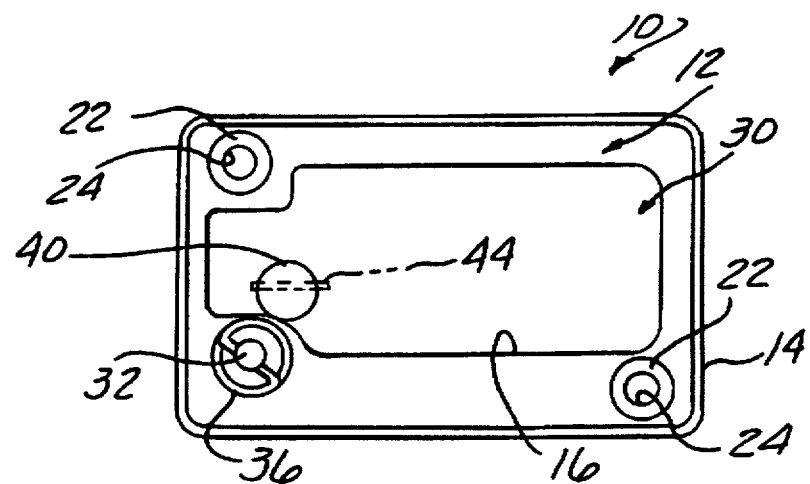
FIG. 3 is a rear view of the security apparatus depicted in FIG. 1, shown in a first position.
Figure 4:
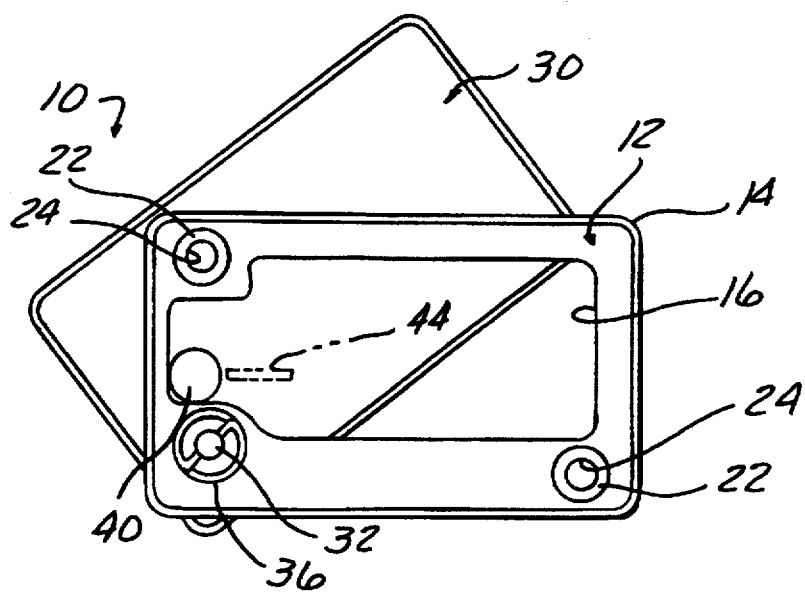
FIG. 4 is a rear view of the security apparatus depicted in FIG. 1 shown in a second position.

Suitable means are provided for mounting the housing 12 to the closure member, such as a vehicle door 17, trunk or hood, or a door or window of a building or home. Such mounting means 18, as shown in FIG. 2, may comprise mounted in the housing 12 and engageable with the closure member 20. As shown in FIGS. 3 and 4, the mounting means 18 may include, by example only, bosses 22 formed on the housing 12. An aperture 24 is formed in each boss 22 for receiving a suitable fastener, such as a screw 18, which passes through the boss 22 into the closure member 20. Alternately, an adhesive may be employed to mount the housing 12 on the closure member 17.

A member 30 is movably attached to the housing 12, such as by means of a pivot pin 32 shown in FIGS. 3 and 4. A biasing means 36, such as a coil spring, is mounted on the pivot pin 34 and engages both the housing 12 and the movable member 30 to bias the movable member 30 to a normal, first position shown in FIGS. 1–3. In the first position, the movable member 30 covers the aperture 16 in the housing 12 and the closure member key lock cylinder 13 mounted adjacent thereto. The movable member 30 may be pivoted or moved in a plane parallel to the plane on the housing 12 to a second position, shown in FIG. 4, allowing access to the key lock cylinder 13 through the aperture 16 in the housing 12.

A magnet 40 is mounted on the movable member 30 and is movable with movement of the movable member 30 between the first and second positions shown in FIGS. 3 and 4, respectively. The magnet 40 may be any suitable magnet, such as a neodymium magnet, part number N612-27 manufactured by Magnetool, Troy, Mich. By way of example only, the magnet 40 has a 0.50 inch diameter and a length of 0.375 inches.

A switch means 44 is mounted on an interior surface of the closure member 17 as shown in FIG. 2. The switch means 44 may comprise any suitable switch, such as a reed switch, having a contact switchable between a first, normally closed position and a second, open position. By way of example only, the switch means 44 may comprise a reed switch, part number HSR-370RT sold by Hermetic Switch, Inc. The switch means 44 is mounted adjacent to the closure member key lock cylinder 13 so as to be disposed in proximity with the magnet 40 when the magnet 40 and the movable member 30 are in the first position shown in FIGS. 2 and 3. In this position, the magnet 40 magnetically switches the contact of the switch means 44 from the first normally closed position to the second, open position. Leads 46 and 48 extend from the switch means 44. The lead 46 is connected to ground, such as by direct contact to the closure member 20 when the closure member 20 is formed of metal, or to circuit ground in the alarm system. The second lead 48 is connected to the alarm system, such as to switches mounted on other closure members or directly to an audible alarm used in such conventional alarm systems.

In operation, with the movable member 30 in the first position shown in FIGS. 1–3, the magnet 40 is disposed in close proximity to the switch means 44 and causes contact of the switch means 44 to switch to the second open position thereby opening a circuit between the alarm and ground to prevent the operation of the alarm. However, when the movable member 30 is pivoted to the second position shown in FIG. 4, the magnet 40 is displaced from proximity with the switch means 44 and enables the contact of the switch means 44 to move to the first, normally closed position thereby completing a circuit between the alarm apparatus power supply, the audible alarm and ground to activate the alarm.

Figure 5:
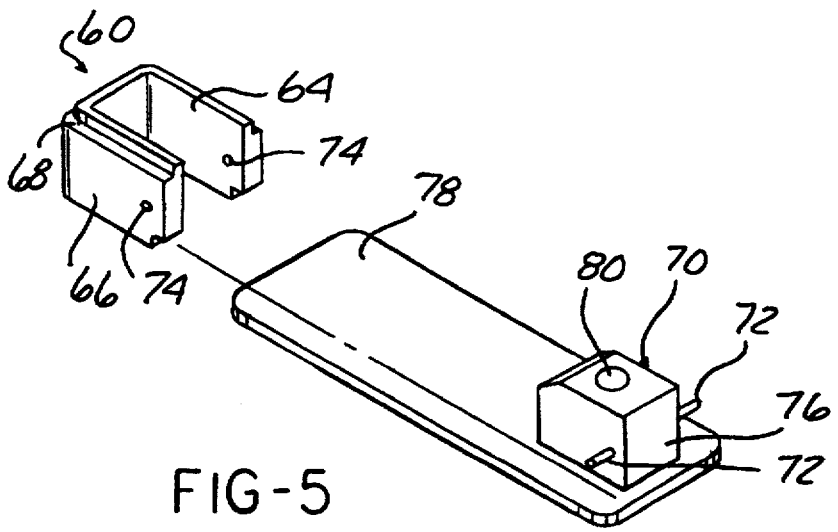
FIG. 5 is an exploded, perspective view of another embodiment of the security apparatus of the present invention, with the arm and base shown in an inverted position.
Figure 6:
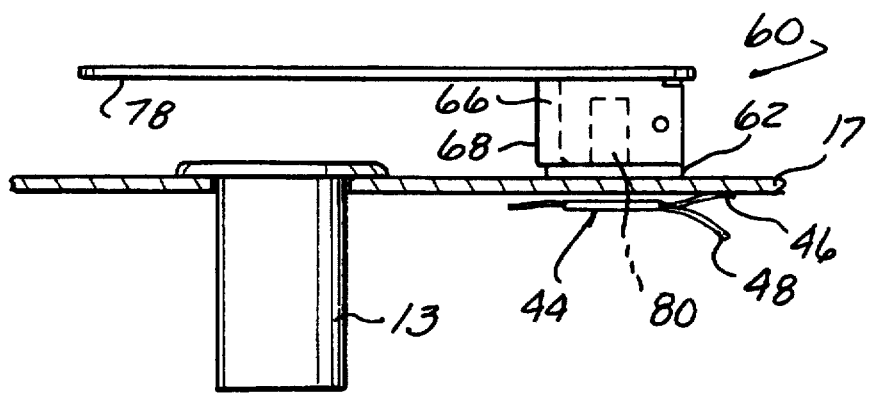
FIG. 6 is a partially cross sectioned, side elevational view of the security apparatus depicted in FIG. 5 in a first position.
Figure 7:
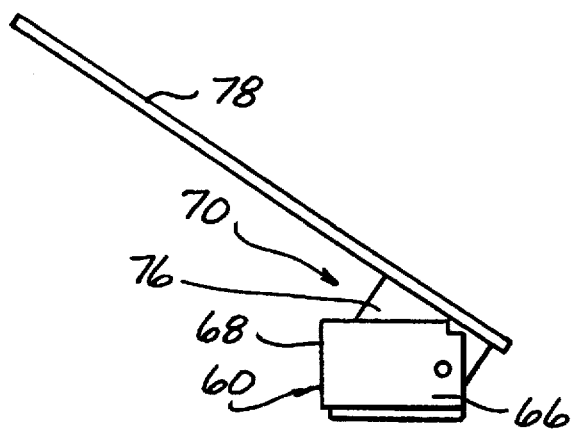
FIG. 7 is a partially cross sectioned, side elevational view of the security apparatus depicted in FIG. 5 shown in a second position.

In a second embodiment shown in FIGS. 5–7, a housing 60 is adapted to be mounted adjacent to a closure member key lock cylinder 13 by suitable means, such as an adhesive 62. The housing 60 has a generally U-shape formed of opposed side walls 64 and 66 and an end wall 68. A recess is formed between the side walls 64 and 66 and the end wall 68 for receiving a movable member 70 therein. The movable member 70 is preferably pivotally attached to the housing 60 by means of pivot pins 72 extending outward from opposite sides of the movable member 70 which engage aperture 74 formed in the side walls 64 and 66 of the housing 60.

In this embodiment, the movable member 70 includes a base 76 carrying the pivot pins 72 and an elongated, planar arm 78 securely attached to and extending outwardly from the base 70. Although the base 76 and the arm 78 may be formed of two separate members which are fixedly joined together, it will be understood that the base 76 and the arm 78 may be integrally formed as a one piece, unitary member.

A magnet 80 is mounted in the base 76 and is adapted to be disposed in close proximity to the switch means 44 mounted on an interior surface of a closure member 17. As in the first embodiment, the switch means 44 includes a switchable contact which is switchable between a first normally closed position and a second open position. One output lead 46 of the contact is connected to ground and the other lead 48 is connected to the alarm system, typically to switches on other closure members or directly to an audible alarm.

In use, the housing 60 having the movable member 70 pivotally attached thereto is mounted on the exterior surface of the closure member 17 such that the magnet 80 is disposed in close proximity to the switch means 44. In the normal mounting position shown in FIG. 6, the arm 78 of the movable member 70 extends over and covers the key lock cylinder 13. In this mounting position, the magnet 80 switches the contact of the switch means 82 to the second open position thereby opening the circuit between the audible alarm, not shown, and ground to prevent activating of the audible alarm. However, any attempt to gain access to the key lock cylinder 13 requires pivotal movement of the movable member 80 from the first position shown in FIG. 6 to the second position shown in FIG. 7. This pivotal movement results in movement of the magnet 80 out of proximity of the switch means 44 which enables the contact of the switch means 44 to switch to the first, normally closed position thereby completing a circuit between the audible alarm and ground to activate the audible alarm. In this manner, an audible alarm is activated immediately upon any movement of the arm 78 prior to any attempt to remove or use of the key lock cylinder 81.

Figure 8:
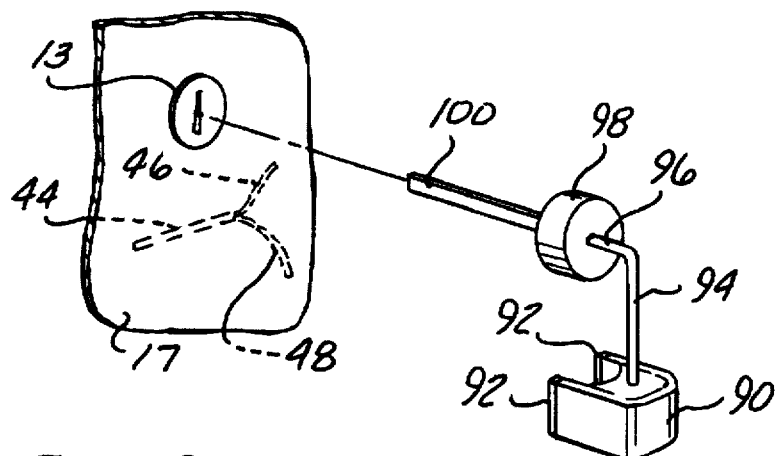
FIG. 8 is a perspective view of yet another embodiment of the security apparatus of the present invention.

Another embodiment of the present invention is shown in FIG. 8. In this embodiment, a body 90 contains or comprises a magnet. By way of example only, the body or magnet 90 has a generally U-shape with suitable protective material or pads 92 mounted at the exterior ends of the legs of the body 90 to protect the exterior surface of the closure member 17 when the body or magnet 90 is mounted thereon. An elongated rod 94 is attached at one end to the body 90 and extends outward therefrom to a second end 96. A holder 98 is affixed to the second end 96 of the rod 94. A key, blank key or other key lock cylinder engagement member 100 is mounted on and extends outward from the holder 98 for releasible insertion into the key lock cylinder 13.

In use, the key lock cylinder engagement member 100 is inserted into the key lock cylinder 13. This positions the body or magnet 90 on the exterior surface of the closure member 17 adjacent to the switch means 44 on the interior side of the closure member 17, as described above and shown in FIG. 6, which is mounted on the interior surface of the closure member 20. The magnet 90 switches the contact of the switch means 44, in the same manner as described above, from a first normally closed position to a second position preventing activation of an audible alarm to which one of the leads of the switch means 44 is connected. Any attempt to gain access to the key lock cylinder or to remove the key lock cylinder 81 from the closure member 20 requires removal of the key lock cylinder engagement member 100. This movement separates the magnet 90 a sufficient distance from the switch means 44 enabling the contact of the switch means 44 to switch to the normally closed position thereby completing a circuit between the audible alarm and ground and activating the audible alarm.

Figure 9:
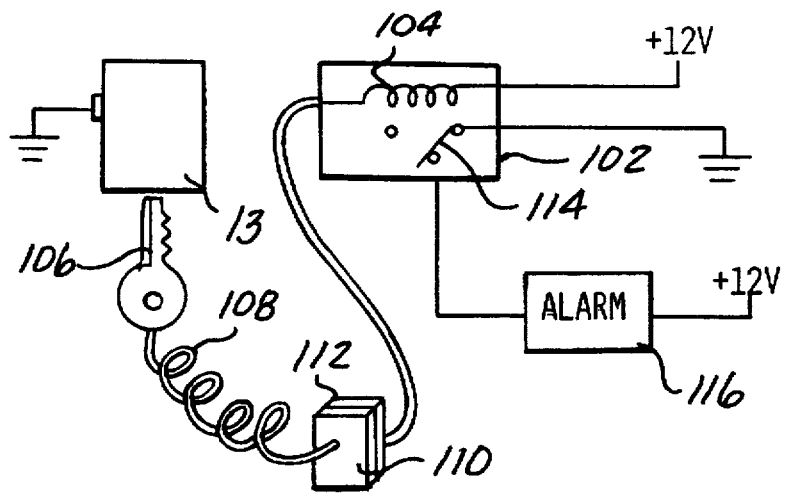
FIG. 9 is a pictorial representation and schematic diagram of yet another embodiment of the security apparatus of the present invention.

Yet another embodiment of the present invention is shown in FIG. 9. In this embodiment, the key lock cylinder 13 on a movable closure member, such as a vehicle door, trunk or hood or a door or window of a building or home, is electrically grounded. A relay 102 mounted on the interior surface of the closure member. Electrical power is connected to a coil 104 of the relay 102. A key or other lock cylinder engagement member 106 is shaped to be slidably inserted into the lock cylinder 13 and is connected to ground when inserted into the key lock cylinder 13. A conductor 108 in the form of a coil is connected to the member 106 and extends through a mounting base 110 securely mounted to the exterior surface of the closure member, such as by means of an adhesive strip or pad 112, to the relay coil 104.

As in the other embodiments of the present invention, the relay 102 has a switchable contact 114 which switches from a first normally closed position, shown in FIG. 9, in which the audible alarm 116 of the alarm system is connected through the contact 114 to ground to activate the alarm, and a second, open position.

In use, when the key 106 is inserted into the grounded key lock cylinder 13, the conductor 108 extending from the key 106 completes a circuit through the relay coil 104 to ground energizing the coil 104 and switching the contact 114 from the first normally closed position shown in FIG. 9 to a second open position disconnecting the audible alarm from ground and preventing activation of the audible alarm. Any removal of the key 106 from the key lock cylinder 13 de-energizes the relay coil 104 enabling the contact 114 to switch to the first normally closed position and completing a circuit between the audible alarm and ground thereby activating the audible alarm.

In summary, there has been disclosed a unique security apparatus for use on vehicles, homes, buildings and the like which activates the alarm system immediately upon any attempt to use or remove a closure access control member, such as a key lock cylinder. The security apparatus is provided in various embodiments, each of which is easily mounted on various closure members, such as the doors, trunk or hood of a vehicle or the doors or windows of a building or home. Further, the security apparatus of the present invention is formed of only a few components for an inexpensive construction which can be easily incorporated into existing vehicle or building and home security systems without extensive modification to such alarm systems.

What is claimed is:

1. A security apparatus for use with an alarm system including a selectively activatable alarm monitoring movement of a closure member movable between at least two positions, a lock means mounted on an external surface of the closure member having an exposed lock actuator actuatable to permit movement of the closure member from a locked position, the security apparatus comprising:

a housing adapted to be mounted on the external surface of the closure member in proximity to the lock actuator;

a member movably attached to the housing and movable from a first location blocking access to the lock actuator to a second location exposing the lock actuator to access;

a magnet mounted on the movable member; and switch means, mounted on a closure member and connected to an alarm for completing an electrical circuit to ground through the alarm to activate the alarm when closed, the switch means being responsive to the close proximity of the magnet for switching to an open position when the magnet is in the first location and a closed position when the magnet is displaced from the first location to the second location.

2. The security apparatus of claim 1 wherein the lock actuator comprises:

a key lock cylinder having a key receiving end.

3. The security apparatus of claim 1 further comprising:

an arm attached to and extending outward from the movable member, the arm covering the lock actuator when the movable member is in the first position.

4. The security apparatus of claim 1 wherein:

the movable member covers the lock actuator when in the first position.

5. The security apparatus of claim 1 wherein:

the housing has a planar shape; and the movable member is mounted for pivotal movement in a plane substantially parallel to the plane in the housing.

6. The security apparatus of claim 1 wherein:

the housing has a planar shape and the movable member is pivotally movable out of the plane of the housing.

7. The security apparatus of claim 1 wherein the switch means comprises:

a reed switch having a magnetically responsive contact switchable between first and second positions.

8. A vehicle alarm apparatus for a vehicle including an alarm activatable on movement of a vehicle closure member, the vehicle alarm apparatus comprising:

lock means, mounted on an external surface of a vehicle closure member, for preventing movement of the closure member from a first position;

a separate housing attachably mounted on an external surface of the vehicle in proximity to the lock means;

a movable member movably mounted on the housing for movement between first and second locations;

the movable member covering the lock means when in the first location to prevent access to the lock means and movable to the second location exposing the lock means to access;

a magnet mounted on the movable member;

switch means, mounted on the closure member and connected to an alarm, for completing an electrical circuit between a power supply and ground to the alarm to activate the alarm when the switch means is closed, the switch means being responsive to the magnet for switching to an open position when the magnet is in the first location in close proximity with the switch means and a closed position when the magnet is displaced from the first location to the second location.

9. The vehicle alarm apparatus of claim 8 wherein:

the lock means comprises a key lock cylinder.

10. The vehicle alarm apparatus of claim 8 wherein:

the housing has a planar form; and the movable member has a planar form and is pivotally mounted to the housing for movement parallel to the plane of the housing during movement between the first and second positions.

11. The vehicle alarm apparatus of claim 10 wherein:

when in the second position, the movable member allows access to the lock means.

12. The vehicle alarm apparatus of claim 8 wherein:

the housing has a planar form; and the movable member is pivotal out of the plane of the housing.

13. The vehicle alarm apparatus of claim 12 wherein:

an arm is attached to and extends outward from the movable member;

the housing is mounted adjacent to the lock means such that the arm covers the lock means when the movable member is in the first position.

14. A security apparatus for use with a security system associated with a movable closure member including an alarm selectively connectable to a power source, the security apparatus comprising:

a magnet;

switch means, mounted on closure member and connected to an alarm for completing an electrical circuit to the alarm to activate the alarm when the switch means is closed, the switch means being responsive to the magnet for switching to a first open position when the magnet is in a first location in close proximity with the switch means and switching to a second closed position when the magnet is displaced from the first location to a second location;

a connector extending from the magnet;

a key lock cylinder entry member mounted on a first end of the connector for releasible insertion into a key lock cylinder carried on the closure member; and wherein when the key lock cylinder entry member is inserted into the key lock cylinder, the magnet is positioned in the first location adjacent to the switch means to switch the switch contact to the first open position, while a movement of the magnet away from the first location causes the switch means to switch to the second closed position connecting power to and activating the alarm.

* * * * *